3,454,545
POLYMERIZATION OF MONO-1-OLEFINS
Jack S. Scoggin, Bartlesville, Okla., assignor to Phillips
Petroleum Company, a corporation of Delaware
Filed Oct. 30, 1964, Ser. No. 407,660
Int. Cl. C08f *1/98, 1/88*
U.S. Cl. 260—93.7  2 Claims

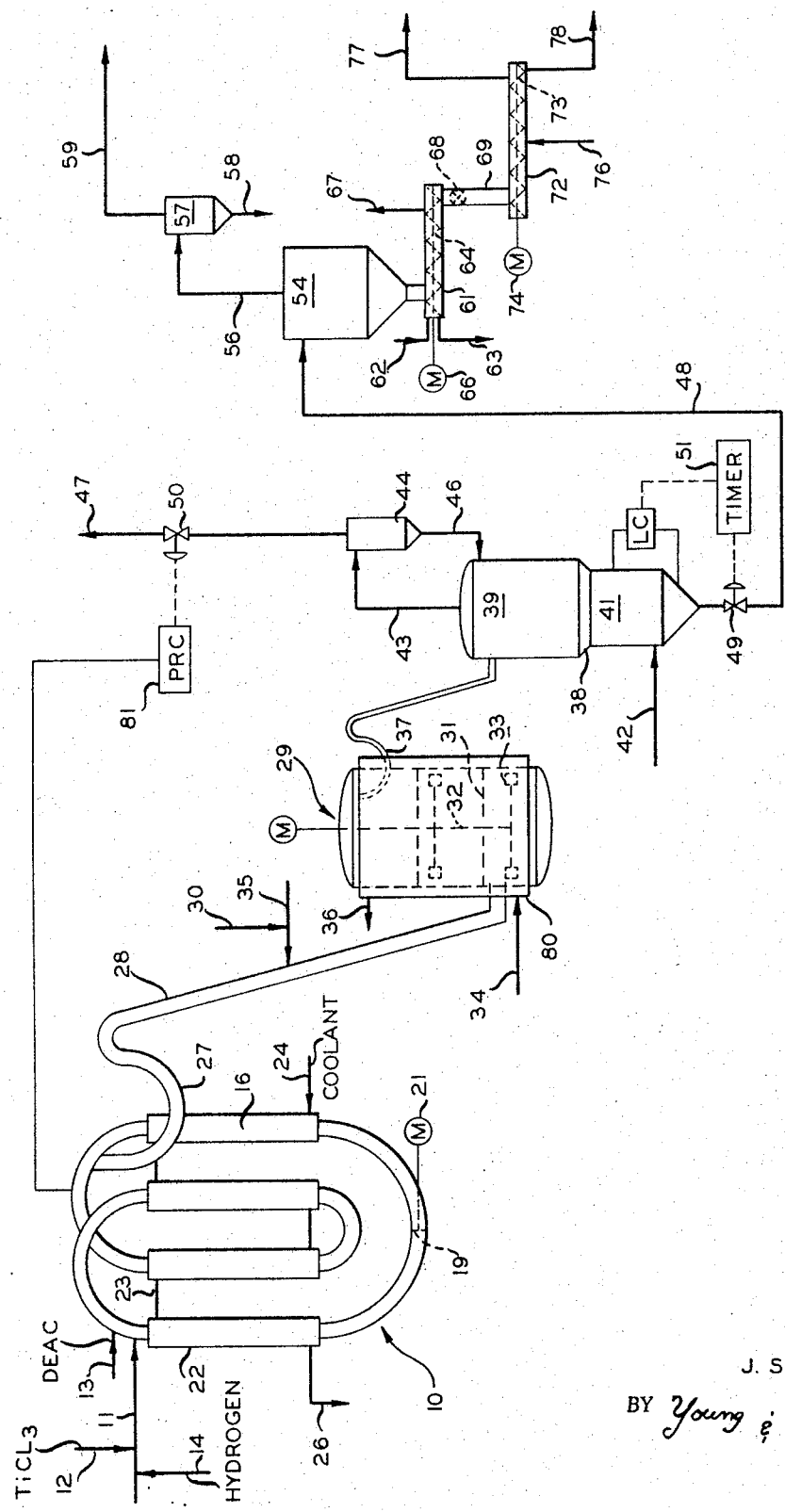

ABSTRACT OF THE DISCLOSURE

Polymer slurry is removed from a reactor through a U-shaped take-off conduit wherein it is settled and concentrated. The concentrated polymer then passes through a stirred contactor for catalyst deactivation and thereafter passes therefrom through a second U-shaped settling pipe into a wash column. Purified polymer is incrementally removed from the bottom of the wash column by passage through an intermittently operated valve which also serves to pulse the flow of solids through the entire train.

---

This invention relates to a method and apparatus for the production of polymers of mono-1-olefins. In one aspect it relates to an improved method for the production of polymers of mono-1-olefins so as to increase the catalyst yield and percent monomer conversion. In another aspect this invention relates to a novel polymerization system for formation of polymers of mono-1-olefins.

Various reactions for polymerizing olefins are described in the literature, and the polymerizations are usually carried out in the presence of catalysts. One type of catalyst which has been widely used in the polymerization of mono-olefins, particularly ethylene, consists of an organometal compound, e.g., triethylaluminum, and a compound of a heavy metal, e.g., titanium tetrachloride. When certain olefins, such as propylene, are contacted with such a catalyst, there is obtained a polymer containing greater or lesser amounts of a fraction which is crystalline and which is characterized by a certain regularity of molecular structure. Thus, a polypropylene molecule can be considered as a chain of 2-carbon units with a methyl side group attached to every other carbon in the chain. Certain polymers of this type are characterized by the fact that they contain series of such monomer units in which all the methyl side groups are oriented in space at the same position or at the same angle with respect to the tertiary carbon atoms to which they are attached. The portion of the polymer having this regular structure is highly crystalline and is generally referred to as isotactic polypropylene. It is recognized that this highly crystalline polypropylene is preferred for most practical applications.

A well-known procedure for preparing isotactic polymers of mono-1-olefins, such as propylene, involves the polymerization of propylene with a catalyst system comprising an alkylaluminum compound and titanium trichloride. While this system is completely operative for the formation of polymers of mono-1-olefins, such as propylene, it is desirable to obtain as high a yield of polymer per unit of catalyst as to reduce the amount of catalyst required and thereby avoid the problems of removing ash content from the resulting polymer product. Likewise, it is desirable to obtain a high percent of monomer conversion so as to avoid the introduction of high amounts of unreacted monomer and attendant catalyst poisons into the reaction system.

It is thus an object of the present invention to provide an improved process for producing polymers of mono-1-olefins. Another object of this invention is to provide a polymerization process wherein there is achieved a high percent feed conversion. Another object of this invention is to provide a polymerization process wherein there is achieved a high rate of catalyst yield. A still further object is to provide a novel polymerization system for the improved production of polymers of mono-1-olefins.

Various other objects, advantages and features of the invention will become apparent to those skilled in the art upon consideration of the accompanying disclosure, the claims, and the drawing, which is a schematic flow diagram illustrating a preferred embodiment of the invention.

The present invention is concerned with an improvement in a process for polymerizing a mono-1-olefin with a catalyst comprising an organometal compound and a metal salt in the substantial absence of a hydrocarbon diluent and under conditions such that the monomer serves as the diluent and a solid polymer in particle form is obtained. Broadly speaking, in a mass polymerization process wherein a liquid mono-1-olefin is contacted with a catalyst capable of polymerizing an effluent containing solid polymer, catalyst residues and liquid olefin is recovered from the polymerization, the improvement resides in the step which comprises pulsating the entire polymerization system so as to transport the polymer through same. More specifically, I have found in accordance with the present invention that by utilizing a polymerization system as described herein in connection with the accompanying drawing and removing the settled polymer from the wash column by means of a pulsated valve, there is achieved a pulsation of the entire polymerization system which in turn serves to remove settled polymer from the reactor and contactor, thus removing less unreacted monomer and catalyst. By operating the novel polymerization apparatus in the above manner, there is achieved an increase in the percent yield of polymer per unit of catalyst and at the same time an increase in the percent of monomer conversion. There is also achieved a reduction in consumption of catalyst removal agents, i.e., acetyl acetone and propylene oxide. The reduced consumption of catalyst removal agents is brought about by (1) increased catalyst productivity, and (2) increased conversion of catalyst removal chemicals in contact tank. (1) results from introduction of less monomer and attendant poisons into reactor and (2) results from removal of a settled polymer phase from the contact tank. In addition, when operating in this manner the polymer produced has a reduced ash content. Such a polymer meets the requirements as to color and heat stability and possesses satisfactory electrical properties. Furthermore, the product obtained by the present process is superior as regards these properties to a polymer which is purified by conventional methods using alcohols or other treating agents. It is also seen that the present process does not introduce foreign materials into the system which require additional equipment for their separation and recovery. In a commercial operation this is, of course, a very important advantage.

As mentioned hereinbefore, the polymers which are treated in accordance with the present invention are prepared from mono-1-olefins. The invention is particularly applicable to the treatment of isotactic polymers which are prepared by polymerizing mono-1-olefins containing at least 3 carbon atoms and preferably not more than 5 carbon atoms. Examples of such monomers include propylene, 1-butene, 1-pentene, 3-methyl-1-butene, and the like. It is to be understood also that mixtures of two or more monomers can be employed in the polymerization to produce copolymers which are then treated by the present process. In a preferred embodiment of the invention, propylene is utilized as the monomeric material.

Since a wide variety of catalyst systems can be employed in the polymerization, it is not intended to limit the invention to any particular catalyst system. Catalyst systems suitable for use in the polymerization are those which are capable of polymerizing a mono-1-olefin in a mass polymerization and under conditions such that solid polymer in particle form is produced. Catalyst systems suitable for use can be broadly defined as comprising an organo-metal compound and a metal salt. A particularly suitable catalyst is one which comprises (a) a compound having the formula $R_nMX_m$, wherein R is an alkyl, cycloaklyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Groups IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triiosobutylaluminum, tri-n-butylaluminum, tri-n-pentylaluminum, triisooctylalumium, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), 3-methylcyclohexylaluminum dichloride, 2-cyclohexylethylgallium dichloride, p-tolylberyllium iodide, di-(3-phenyl-1-methylpropyl)indium fluoride, 2-(3-isopropylcyclohexyl)ethylthallium dibromide, and the like.

The metal halide component of the catalyst system is preferably a halide of a Group IV–A metal, i.e., titanium, zirconium, hafnium and germanium. However, it is to be understood that halides of metals of the other groups specified above, such as vanadium, molybdenum, tungsten, cobalt and iron can also be employed in the catalyst system. The trichlorides, trifluorides, tribromides and triiodides, as well as the tetrachlorides, tetrafluorides, tetrabromides and tetraiodides of the various metals, can be used in the catalyst system, either individually or as mixtures of two or more of the metal halides. It is usually preferred to employ a trichloride, such as titanium trichloride, in the polymerization.

The preferred catalyst system employed in the polymerization comprises a dialkylaluminum chloride and titanium trichloride, the latter compound preferably being prepared by reduction of titanium tetrachloride in the presence of aluminum. The reduction product is preferably a complex having the formula $3TiCl_3 \cdot AlCl_3$. The reduction reaction is usually carried out at an elevated temperature, for example, at a temperature in the range of 360° to 600° F., preferably from 375° F. to 450° F.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols. When employing the preferred catalyst system, the mol ratio of the dialkylaluminum halide to the titanium trichloride complex usually ranges from 1.0:0.005 to 1.0:50.0, preferably 1.0:0.1 to 1.0:10.0. The amount of the dialkylaluminum halide used should be at least $1.0 \times 10^{-4}$ gm./gm. of monomer and can be as much as $25 \times 10^{-4}$ gm./gm. of monomer. The amount of titanium trichloride complex employed would generally be in the range of $1.5 \times 10^{-4}$ to $10 \times 10^{-4}$ gm./gm. of monomer.

Although not essential to the conduct of the polymerization, it is often desirable to carry out the polymerization in the presence of elemental hydrogen. When so operating, hydrogen is added in an amount sufficient to provide from 0.05 to 0.4 mol percent hydrogen in the liquid mono-1-olefin phase in the polymerization zone. By operating in this manner, the productivity of the catalyst is increased, melt flow is controlled, and certain properties of the polymer, e.g., flexural modulus, are improved.

The diketones suitable for use in the practice of the present invention include alpha-diketones and beta-diketones. These diketones can also be defined as being selected from the group consisting of compounds having the formulas:

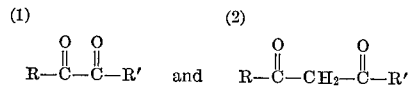

wherein R and R′ are hydrocarbon radicals, such as alkyl, cycloalkyl and aryl. Examples of suitable alpha-diketones include the following: 2,3-butanedione, 2,3-pentanedione, 3,4-hexanedione, 4-methyl-2-3-pentanedione, 3-4-heptanedione, 5-methyl-2,3-hexanedione, 2,5-dimethyl-3,4-hexanedione, 2,2,5,5-tetramethyl-3,4-hexanedione, 1,2-cyclopentanedione, 3-methyl-1,2-cyclopentanedione, 1,2-cyclohexanedione, bibenzoyl, bi-2-furoyl, methylphenylglyoxal, phenylbenzylglyoxal, 4,4′-dimethoxybenzil, and the like. The following are examples of suitable beta-diketones: 2,4-pentanedione (acetylacetone), 2,4-hexanedione, 2,4-heptanedione, 5-methyl-2,4-hexanedione, 2,4-octanedione, 5,5 - dimethyl-2,4-hexanedione, 3 - ethyl-2,4-pentanedione, 3,3-diethyl-2,4-pentanedione, 2,2 - dimethyl-3,5-nonanedione, 1-cyclohexayl-1,3-butanedione, 5,5-dimethyl-1,3-cyclohexanedione, 1-phenyl-1,3-butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3-butanedione, 1-phenyl-2-benzyl-1,3-butanedione, 1-phenyl-3-(2-methoxyphenyl)-1,3-propanedione, 1-(4-nitrophenyl)-1,3-butanedione, 1-(2-furyl)-1,3-butanedione, 1-(tetrahydro-2-furyl)-1,3-butanedione, and the like.

A more comprehensive understanding of the invention can be obtained by referring to the drawing, which is a flow diagram illustrating a preferred embodiment of the invention. While the drawing is described with regard to a process in which propylene is polymerized with a specific catalyst system, it is to be understood that it is not intended to limit the invention to this specific embodiment. As discussed hereinbefore, the invention is broadly applicable to the treatment of polymers of mono-1-olefins prepared by mass polymerization, utilizing a catalyst capable of polymerizing the monomer to a solid polymer under the conditions employed. As used herein, the term "mass polymerization" is used to designate a polymerization which is conducted with the monomer in liquid phase and without the addition of more than small amounts of an inert diluent. The expression "small amounts of an inert diluent" is intended to mean such amounts of inert diluent as may be introduced into the polymerization zone by way of inert material in the monomer feed and inert diluent employed for ease of handling the catalyst components.

Referring now to the drawing, propylene is charged to reactor 10 through line 11. Prior to use in the polymerization, the propylene is treated by conventional methods in order to remove contaminants such as oxygen, $CO_2$ and moisture. It is also the usual practice to purge the reactor with an inert gas, such as nitrogen, in order to remove such contaminants prior to commencement of the polymerization. Lines 12 and 13, respectively, provide means for charging the catalyst ingredients, namely the titanium trichloride complex and the diethylaluminum chloride, to the system. It is noted that line 12 is connected to line 11 so that the titanium trichloride enters the reactor along with the liquid propylene. As mentiioned above, it has been found to be advantageous to conduct the polymerization in the presence of hydrogen. As shown, the hydrogen enters the propylene feed line through line 14 and is charged to the reactor along with the liquid propylene.

The reactor illustrated in the drawing is a loop-type reactor which comprises two loops. Each loop is composed of two straight legs 16 which may conveniently be in the form of elongated pipe sections. The ends of the legs of the reactor are conveniently interconnected by means of ells so as to provide a continuous flow path through the reactor. The reactor is furnished with an impeller 19 which is operatively connected to a turbine 21. The operation of the impeller provides motive force for flowing the materials through the loop reactor. The vertical legs of the loop reactor are encompassed by heat exchange jackets 22 which are interconnected by means of line 23. Line 24 connected to the heat exchange jacket associated with one of the outer legs provides means for introducing a coolant such as water. The coolant flows through the heat exchange jackets at a temperature and at a rate such as to maintain a desired polymerization temperature in the reactor. The coolant is removed from the reactor system by means of line 26 which is connected to the other outer leg of the reactor. Although it is often preferred to employ a loop-type reactor, it is to be understood that the polymerization can be conducted in any suitable polymerization zone, such as in a closed reaction vessel provided with a stirring means.

The conditions employed in conducting the polymerization will vary somewhat depending upon the mono-olefin utilized. The polymerization temperature is generally in the range of 0 to 160° F. In the polymerization of ethylene, a temperature in the range of 0 to 45° F. is usually employed. In the case of propylene, the temperature in the reactor 10 can vary within the range of 90 to 160° F. When polymerizing a higher olefin, such as 1-butene, a lower polymerization temperature is used, e.g., 86° F. or lower. In the polymerization of olefins containing 5 carbon atoms, still somewhat lower temperature are utilized, e.g., about 75° F. or lower. In general, the polymerization is conducted at a temperature such that solid polymer in particle form is obtained in the polymerization. The actual amount of solid polymer formed is also dependent upon the particular catalyst system used. It has been found that the preferred catalyst system as described above produces a very high percentage of solid polymer with a minimum formation of soluble polymer. The pressure employed in reactor 10 is sufficient to maintain the reactants in the liquid phase, e.g., a pressure in the range of 275 to 1000 p.s.i.g. The maximum pressure used is only limited by practical considerations, although it is generally undesirable to exceed a pressure of 2000 p.s.i.g. When polymerizing ethylene, the lower limit of pressure is about 425 p.s.i.g. at a polymerization temperature of about 0° F. In the case of the polyymerization of propylene, the lower limit of pressure is about 225 p.s.i.g. at a polymerization temperature of about 90° F. In the case of the higher olefins the lower limit of pressure will be somewhat lower. The pressure desired in reactor 10 can be conveniently regulated by an automatic control means as will be discussed more in detail hereinafter. The residence time in reactor 10 can range from about 1 to about 5 hours, with a residence time of about 3 hours being preferred.

The solid polymer formed in reactor 10 settles in the U-shaped settling leg 27. Under the conditions of operation, the portion of the U-tube or leg 27 in communication with the reactor leg has a turbulence created therein in which no settled polymer is present. On pulsating the system as will be described below, the settled polymer is removed throguh conduit 28 into a lower portion of contact tank 29. Although it is within the contemplation of the invention to provide heat to the polymer slurry while in conduit 28, it is more desirable to add heat to the contact tank 29 since it has been found that improved results as regards catalyst removal are obtained if the temperature maintained in the contact tank is slightly higher than the polymerization temperature. In the case of polypropylene, the effluent in line 27 is usually heated to a temperature in the range of 100 to 170° F. In the case of effluents containing higher olefin oplymers, a somewhat lower temperature can be used. The pressure in contact tank 29 is sufficient to maintain the propylene in the liquid phase, and it is usually substantially the same as the pressure in reactor 10. Lines 30 and 35 provide means for introducing a diketone, such as acetylacetone, together with propylene oxide, into the contact tank. It is noted that line 30 is connected to line 28 so that the acetylacetone and propylene oxide enters the contact tank along with the effluent.

In contact tank 29 the acetylacetone and propylene oxide are thoroughly mixed with the effluent from the reactor 10. The contact tank depicted in the drawing comprises an enclosed vessel having baffle members 31 disposed in the upper and lower portions of the tank. The baffle members are attached to the walls of the tank and are each provided with a central opening through which the shaft of stirring means 32 passets. The positioning of the baffle members in this manner in effect divides the contact tank into upper, intermediate and lower sections. Each of these sections is provided with a stirrer 33 which is attached to the shaft of stirring means 32. A jacket 80 is provided for heating contactor contents by circulation of heating medium 34 in and 36 out. It has been found that particularly good contact is obtained between the acetylacetone and the effluent from reactor 10 when utilizing this specific structure. However, it is to be understood that it is not intended to limit the invention to any particular contact tank and that any enclosed vessel which can be jacketed for the addition of heat thereto, provided with a suitable stirring means, can be employed.

The diketone, e.g. acetylacetone, can be introduced into line 28 by itself, or it can be added as a solution in a hydrocarbon which is inert to the reactants. The amount of treating agent added in this manner can range from 1 to 5 times the stoichiometric equivalent, based on the amount of catalyst present. The contact time in contact tank 29 can vary within rather wide liimts, e.g. from 5 minutes to 5 hours. However, it is usually preferred to use a contact time in the range of 1 to 2 hours. Addition hydrocarbon such as propylene can be added to the tank as required to regulate the solids content thereof.

The treated effluent is withdrawn from an upper portion of contact tank 29 through U-shaped conduit 37 having a portion thereof positioned inside tank 29 as illustrated. The vertical leg of conduit 37 inside the contacting tank allows the polymer to settle by gravity into the U-shaped conduit. The degree of flow in conduit 37 as well as in conduit 28 is dependent on the operation of the wash column as hereinafter described. The treated effluent is then passed into the upper portion of wash column 38. It is preferred to introduce the effluent into a lower portion of the contact tank and to withdraw the treated effluent from an upper portion of the tank since this method of operation ensures good contact between the solid polymer particles and the acetylacetone. As shown in the drawing, the wash column comprises an enlarged upper portion 39 and a smaller lower portion 41. This type of structure is preferred although it is within the scope of the invention to employ a wash tank having a uniform cross section. Line 42 provides means for introducing wash liquid into the lower portion of the wash column. Although various light hydrocarbons, particularly paraffinic hydrocarbons containing from 4 to 6 carbon atoms per molecule, such as n-pentane, can be employed as the wash liquid, it is preferred to utilize the monomer, e.g., propylene, for this purpose. Furthermore, because of the improved results obtained with propylene, it is not to be implied that the use of propylene is equivalent to the use of a material such as pentane as the wash liquid. It is also within the scope of the invention to employ a mixture of the monomer and a light hydrocarbon as the wash liquid. The effluent entering the wash column through line 37 flows downwardly therethrough and contacts the liquid propylene in countercurrent flow. The liquid propylene in contacting the solid polymer removes catalyst residues, and the solid polymer settles into the bottom of the wash column. This settling of the polymer is facilitated by providing a wash column with an enlarged or expanded upper portion 39. The ratio of the cross sectional area of the enlarged upper portion to the cross sectional area of the lower portion of the wash column is usually in the range of 1.5 to 2.5. When the wash liquid reaches the enlarged upper portion of the wash column, its velocity is decreased, thereby causing solid polymer contained in the propylene to fall toward the bottom of the column. In general, the velocity of the wash liquid in the enlarged upper portion is maintained at the minimum value which is consistent with efficient removal of catalyst residues. This manner of operation conserves the amount of wash liquid used and reduces to a minimum the amount of polymer carried out of the wash column in the overhead stream. The velocity of the wash liquid in the enlarged upper portion of the wash column is usually in the range of 0.5 to 2.0, preferably from 0.2 to 1.0, feet per minute. The ratio of the amount of wash liquid to polymer, on a weight basis, is generally in the range of 2:1 to 25:1. Actually, the upper limit is not critical, being limited only by the capacity of the column. However, as regards the lower end of the range, there must be enough wash liquid to provide good contacting and a "hindered" settling effect in the column.

The overhead stream recovered from wash column 38 through line 43 contains propylene, soluble polymer, catalyst residues and a small amount of solid polymer. The overhead stream is passed into cyclone separator 44, the underflow from which contains the solid polymer. The solid polymer separated in cyclone separator 44 is returned to the wash tank by means of line 46. The overflow from cyclone separator 44, which is withdraw through line 47, contains propylene, soluble polymer and catalyst residues. This stream can be further treated in order to recover the propylene for further use in the process.

The temperature maintained in the wash column is generally somewhat lower than that in the contact tank. This results from the fact that the propylene charged through line 42 is generally at a comparatively low temperature, e.g., 100° F. and below. The pressure maintained in the wash tank is sufficient to maintain the propylene in the liquid phase.

As mentioned above, the solid polymer in the wash column settles to the bottom of the tank. As a result of this settling, the slurry of solid polymer in propylene recovered through line 48 generally contains up to about 65 weight percent solids, e.g., from 40 to 65 weight percent. The settled slurry of polymer in propylene is withdrawn from the wash tank through a suitable flow control means, such as cyclically operated motor valve 49. This valve is operatively connected to timer 51 which controls the frequency of the valve cycle. The slurry can be withdrawn from the wash tank at any desired rate merely by adjusting the setting of the timer. It is preferred to utilize a cyclically operated motor valve which opens, e.g. every 10 to 120 seconds for a short period of time, e.g., of about 1 second. This type of operation creates instantaneous pressure and velocity changes in the column, thereby causing turbulence and a concomitant shearing of the polymer particles. As a result, the efficiency of the washing action is greatly increased. It is also within the scope of the invention to control the operation of the timer by means of a solids level controller 55 which is operatively connected to the lower portion of the wash tank and to the timer. When utilizing this arrangement of apparatus, the timer operates motor valve 49 so that a desired level of polymer solids is maintained in the bottom portion of the wash tank. The valve 49 is generally so adapted that the opening of same creates a pulsation of the entire reaction system and is of sufficient duration to force the movement of the settled solid polymer in the U-shaped conduits to move forward therein for a distance sufficient to allow further polymer to settle in the lower portion of the tubular conduits. The term reaction system is understood to include the polymerization reactor, the catalyst contact tank and the wash column. Thus, as the valve 49 is repeatedly opened the settled solid particles are incrementally passed not only from the wash column but also from reactor to the contact tank and from the contact tank to wash column.

Upon passing through valve 49, which operates as a pressure letdown valve, the polymer slurry flashes as it passes into flash tank 54. In the flash tank the pressure may range from 16 to 65 p.s.i.g. while the temperature may be in the range of −50 to +70° F. The propylene which flashes off is withdrawn from the flash tank through line 56 and then passed into cyclone separator 57. In the cyclone separator, any solid material contained in the gaseous propylene stream is recovered as underflow through line 58 and is usually discarded. The gaseous propylene is recovered as the overflow through line 59. The gaseous propylene is thereafter reused in the process after being subjected to suitable purification operations.

Solid polymer in particle form and containing residual amounts of propylene is withdrawn from the bottom of flash tank 54 and falls into dryer-conveyor 61. This conveyor is equipped with a jacket through which hot water or other suitable heat exchange fluid can be circulated. The heat exchange fluid is introduced into the jacket through line 62 and is withdrawn therefrom through line 63. Conveyor 61 is provided with an auger 64 which is powered by a motor 66. As the polymer solids are moved through the conveyor by means of the auger, propylene is evaporated as a result of the heat added to the moving polymer by the hot water circulating through the jacket. The propylene vapors are removed from conveyor 61 through line 67. This gaseous propylene can thereafter be suitably treated and reused in the process. After the polymer solids are conveyed to the end of conveyor 61, they are passed through rotary valve 68 positioned in conduit 69. The polymer solids then drop into purge conveyor 72 which contains an auger 73 driven by a motor 74. As the polymer solids are moved through conveyor 72, they are contacted with a heated non-combustible gas introduced through line 76. Any suitable non-combustible gas, such as carbon dioxide, nitrogen, steam, or the like, can be utilized. In flowing through conveyor 72, the gas contacts the polymer solids as they are moved therethrough, thereby evaporating residual amounts of propylene and also purging previously evaporated propylene. The gases are withdrawn from conveyor 72 through line 77 after which they can be passed to a flare. Polymer solids, substantially free of propylene and having an ash content of less than about 0.01 weight percent, are recovered from purge conveyor 72 through line 78. The polymer so recovered can then be transferred to suitable storage facilities or to subsequent operations such as packaging or pelleting.

The polypropylene product prepared in accordance with this invention has utility in applications where solid plastics are employed. The polymer can be molded to form articles of any desired shape such as bottles and other containers for liquids. Furthermore, the products can be formed into fibers and pipe by extrusion.

A more comprehensive understanding of the invention can be obtained by referring to the following illustrative example which is not intended, however, to be unduly limitative of the invention.

Example

Propylene is polymerized in a mass polymerization in the presence of hydrogen and utilizing a catalyst consisting of diethylaluminum chloride and a titanium trichloride complex. The titanium trichloride complex is prepared by reacting titanium tetrachloride with aluminum, and the complex comprises 4.74 weight percent aluminum, 25.0 weight percent titanium, and 69.8 weight percent chlorine. The product obtained from the polymerization is thereafter treated in accordance with the present invention so as to obtain a polymer product having a very low ash content. The polymerization and the treatment of the polymer are conducted in equipment similar to that shown in FIGURE 1 and the details of the process are described hereinafter in conjunction with that figure.

A purified feed stream of liquid propylene is charged to loop reactor 10 through line 11. The titanium trichloride complex and the diethylaluminum chloride are introduced into the reactor through lines 12 and 13. Hydrogen enters the reactor along with the propylene after being introdduced into the propylene feed line through line 14. The loop reactor is operated at a temperature of 130° F. and a pressure of 370 p.s.i.a. The polymeribation temperature is maintained at 130° F. by circulating water through the heat exchange jackets with which the loop reactor is provided. The residence time of the reactant materials in the loop reactor is about 3 hours. Polymer particles are accumulated in a U-shaped conduit which is convex downward with two legs extending upward. The accumulated polymer is moved incrementally by pulsation of the system through line 27. The body of polymer contains about 50 weight percent solid polymer.

The effluent recovered from the loop reactor is then paassed into contact tank 29. Prior to entering the contact tank, a solution of acetylacetone and propylene oxide is added to the strem. In the contact tank, the solid polymer is brought into intimate contact with the acetylacetone and propylene oxide. The conact tank is operated at a temperature of 140° F. and a pressure of 370 p.s.i.a. The temperature in the contact tank is maintained at 140° F. by heating jacket 80. After a contact time of one hour, the treated effluent stream is passed into wash column 41 by allowing polymer to incrementally settle into a U-shaped conduit having one vertical leg thereof positioned with the contact tank. Pulsation of the entire reaction system causes the settled polymer phase collected in the U-tube to move progressively into wash column 41. In the wash column, the treated solid polymer is contacted in countercurrent flow with liquid propylene charged to the tank through line 42. About 4 pounds of liquid propylene per pound of polymer is employed as the wash liquid. A stream containing liquid propylene, catalyst residues and soluble polymer is taken overhead from the wash column through line 43 and thereafter passed into cyclone 44. Solid polymer carried over in the overhead stream is separated out in the cyclone and returned to the wash tank through line 46. The overflow from the cyclone is recovered through line 47, and the rate of withdrawal of the overflow is controlled by reactor valve 50 which operates through pressure recorder controller 81 so as to maintain a pressure of 370 p.s.i.a. in the loop reactor. A slurry containing about 50 weight percent solid polymer in liquid propylene is withdrawn from the bottom of wash tank 41 through line 48. The rate of withdrawal of the solid polymer is controlled by means of a cyclically operated motor valve 49. After passing through motor valve 49, the slurry of solid polymer in liquid propylene passes into flash tank 54 which is operated at a temperature of 50° F. and 25 p.s.i.a. The propylene flashes off and is removed from the flash tank through line 56. After separation of any solids contained in the gaseous propylene by means of cyclone 57, the material is then treated prior to reuse in the process.

Motor valve 49 is so timed that it remains open for a period sufficient in duration to allow the pressure drop in the system caused by the opening of the valve to move the settled polymer in the U-shaped conduit 27 to move downstream a distance not to exceed the length of the gravity settling zone. In this manner a second body of settled polymer builds up in the U-shaped conduit or settling leg 27 which is equivalent to the first body which has previously moved forward toward the contact tank. Simultaneously, flow of collected solids from the contact tank to the wash column occurs in a similar manner.

Solid polymer containing residual propylene drops from the bottom of flash tank 54 into dryer-conveyor 61. In the conveyor, the polymer is heated by means of hot water which is circulated through the jacket with which the conveyor is equipped. As a result of this heating, propylene is evaporated and then removed through line 67. Polymer solids fall through conduit 69 attached to the end of conveyor 61 and then enter purge conveyor 72. In the purge conveyor, the polymer solids are contacted with nitrogen which functions as a purge gas to remove any remaining propylene. Solid polypropylene in particle form, which is recovered from the purge conveyor through line 78, is thereafter passed to suitable storage facilities. The polypropylene so recovered contains less than 0.01 weight percent ash. The various flow rates employed in the above-described process are shown hereinafter in the table. The rates shown in the table are in pounds per stream day, and the stream numbers refer to the line numbers shown in the drawing.

By operating the system utilizing the novel equipment described in conjunction with the accompanying drawing and in a manner as previously indicated, there is achieved a reduction in the total volume of propylene which is required to be introduced into the system which in turn allows for an increase in the amount of catalyst yield. While not wishing to be bound by any particular theory, it is believed that this occurs due to the reduc-

TABLE

|  | Propylene to reactor | TiCl₃ to reactor | DEAC to reactor | Hydrogen to reactor | Reactor effluent | Acetylacetone to contact tank | Propylene oxide to contact tank | Contact tank effluent |
|---|---|---|---|---|---|---|---|---|
| Stream No | 11 | 12 | 13 | 14 | 27 | 30 | 35 | 37 |
| Hydrogen |  |  |  | 30 | 30 |  |  | 30 |
| Propylene | 177,260 |  |  |  | 81,000 |  |  | 81,000 |
| Propane | 9,000 |  |  |  | 9,000 |  |  | 9,000 |
| Acetylacetone |  |  |  |  |  | 480 |  | 240 |
| n-Pentane |  |  | 120 |  | 120 |  |  | 120 |
| Soluble polymer |  |  |  |  | 4,800 |  |  | 4,800 |
| Polypropylene |  |  |  |  | 91,460 |  |  | 91,460 |
| DEAC ¹ |  |  | 40 |  | 40 |  |  |  |
| Propylene oxide |  |  |  |  |  |  | 75 |  |
| Titanium trichloride |  | 60 |  |  | 60 |  |  |  |
| Catalyst residue |  |  |  |  |  |  |  | 415 |
| Inert gas |  |  |  |  |  |  |  |  |
| Total, lb./s.d | 186,260 | 60 | 160 | 30 | 186,510 | 480 | 75 | 187,065 |

|  | Propylene to wash column | Wash column overhead | Washed polymer to flash tank | Flash tank overhead | Inert gas to purge conveyer | Purge conveyer offgas |  |
|---|---|---|---|---|---|---|---|
| Stream No | 42 | 43 | 48 | 56 | 76 | 77 | 78 |
| Hydrogen |  | 30 |  |  |  |  |  |
| Propylene | 324,000 | 324,000 | 81,000 | 80,820 |  | 180 |  |
| Propane | 36,000 | 36,000 | 9,000 | 8,980 |  | 20 |  |
| Acetylacetone |  | 240 |  |  |  |  |  |
| n-Pentane |  | 120 |  |  |  |  |  |
| Soluble polymer |  | 4,800 |  |  |  |  |  |
| Polypropylene |  |  | 91,460 |  |  |  | 91,460 |
| DEAC ¹ |  |  |  |  |  |  |  |
| Propylene oxide |  |  |  |  |  |  |  |
| Titanium trichloride |  |  |  |  |  |  |  |
| Catalyst residue |  | 415 |  |  |  |  |  |
| Inert gas |  |  |  |  | 800 |  |  |
| Total, lb./s. d | 360,000 | 365,605 | 181,460 | 89,800 | 800 | 200 | 91,460 |

¹ Diethylaluminum chloride.

tion of poisons being introduced into the system which would otherwise have an adverse effect on the catalyst. In addition, by utilizing the pulsating effect on the system which occurs due to the pressure drop on opening the valve 49, there is achieved a reduction in the amount of monomer which is carried through the overall system and which must be subsequently recovered. Further, there is avoided the necessity of employing valve means in the system other than at a point downstream of the wash column.

As will be evident to those skilled in the art, many variations and modifications of this invention can be made in view of the foregoing disclosure without departing from the spirit and scope of the invention.

I claim:

1. In a polymerization process wherein a liquid mono-1-olefin contacted in a polymerization zone with a catalyst capable of polymerizing said olefin under polymerization conditions so as to form solid polymer and wherein the effluent from said polymerization zone containing solid polymer, catalyst residues and liquid olefin is thereafter passed to a catalyst deactivation zone and contacted therein with a catalyst deactivation agent, and wherein the effluent from said catalyst deactivation zone is then introduced into a wash zone wherein it is washed with a low boiling hydrocarbon and wherein the thus treated solid polymer is thereafter recovered from the effluent of said wash zone as a product of the process, the improvement which comprises concentrating said effluent from said polymerization zone and said catalyst deactivation zone by introducing each of said effluents into a U-shaped concentration zone and incrementally moving the resulting concentrated polymer containing effluent through said concentration zones by pulsating the reaction system.

2. Apparatus comprising, in combination, a polymerization reactor, a catalyst deactivation vessel and a polymer wash column, first conduit means to introduce monomer and catalyst into said reactor, first U-shaped conduit means communicating with said reactor and said deactivation vessel to remove and concentrate solid polymer from said reactor and introduce the resulting concentrated polymer to said deactivation vessel, second U-shaped conduit means communicating with said deactivation vessel and said wash column to remove and concentrate solid polymer from said deactivation vessel and introduce the resulting concentrated polymer to said wash column, second conduit means to introduce a deactivation agent to said deactivation vessel, third conduit means to introduce wash medium to said wash column, fourth conduit means to remove solid polymer from said wash column, and valve means positioned in said fourth conduit means to regulate the flow of solid polymer from said wash column.

References Cited

UNITED STATES PATENTS 3,324,093 6/1967 Alleman.
3,198,777 8/1965 Van den Berg.
3,203,943 8/1965 Houser _____ 260—93.7

JAMES A. SEIDLECK, *Primary Examiner.*

U.S. Cl. X.R.

23—288.3; 260—88.2, 94.9